June 7, 1932.  T. E. BEAUMONT ET AL  1,862,045
APPARATUS FOR THE HYDRAULIC TRANSMISSION OF POWER
Filed Feb. 23, 1929
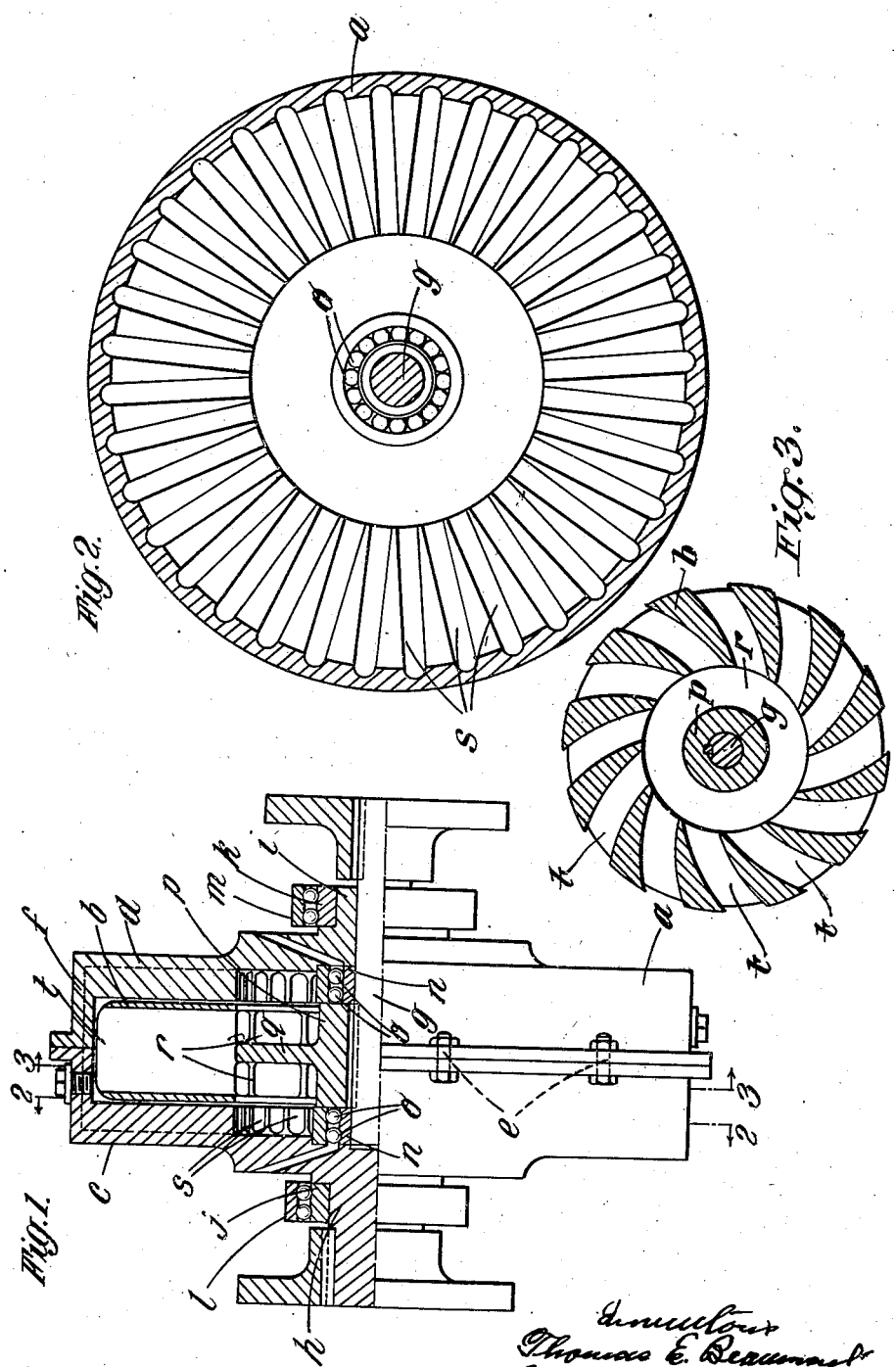

Patented June 7, 1932

1,862,045

UNITED STATES PATENT OFFICE

THOMAS EDGAR BEAUMONT AND JOHN NOEL WARING, OF LONDON, ENGLAND

APPARATUS FOR THE HYDRAULIC TRANSMISSION OF POWER

Application filed February 23, 1929, Serial No. 342,163, and in Great Britain April 25, 1928.

This invention relates to apparatus for the hydraulic transmission of power and to clutches, dynamometers or variable speed mechanisms of the type in which a body of liquid while under the influence of centrifugal force is employed for the purpose of transmitting power from one to the other of a pair of concentric rotary members arranged one within the other.

According to the invention the apparatus comprises a pair of rotors arranged one within the other the internal rotor being adapted to be driven from the external rotor through the medium of a body of liquid while under the influence of centrifugal force, conduits or channels being formed in the rotors for the passage or circulation of such liquid. The internal rotor may be formed with a series of blades or vanes which are preferably curved and arranged in such a manner that when the external rotor is rotated and the body of liquid, or a portion thereof, is rotating therewith in contact with the inner wall of such rotor, the moving liquid is caused to impinge against the blades or vanes and thus apply a torque to the internal rotor, the liquid then passing along the blades to a central chamber or axially arranged drum. It is preferred, however, that the internal rotor shall be constituted by a cylinder formed with a series of inwardly extending conduits or channels each of which is shaped in such a manner that one of the walls thereof acts like the active surface of a blade or vane, the said conduits or channels communicating at their inner ends with the central chamber or drum. A small clearance is provided between the outer periphery of the internal rotor and the inner periphery of the external rotor for the flow of the liquid and return conduits or channels are provided for enabling liquid in the central chamber or drum to return to the space between the two rotors. The return conduits or channels may be constituted by radial or curved grooves formed in the inner surfaces of the side walls of the external rotor.

In order that the said invention may be clearly understood and readily carried into effect, the same will now be described more fully with reference to the accompanying drawing, in which:—

Figure 1 is a view half in section and half in outside elevation of an apparatus embodying the invention, and Figures 2 and 3 detail views of the external and internal rotors, the sections being taken at lines 2—2 and 3—3 respectively of Figure 1.

$a$ is the external rotor and $b$ is the internal rotor. The external rotor is made up of two recessed cylindrical parts or castings $c$ and $d$ secured together by bolts $e$ so that the recesses coincide to form a cavity $f$ accommodating with a small clearance the internal rotor $b$. The internal rotor is keyed to a central shaft $g$ and the part $c$ of the external rotor is formed with a journal $h$ which is co-axial with the shaft $g$. The other part $d$ of the external rotor is formed with a hollow journal or sleeve $i$ through which the central shaft $g$ passes. The journals $h$ and $i$ are equipped with ball races $j$ and $k$ enabling the external rotor to be rotatably supported in ball bearing supports $l$ and $m$. The central shaft $g$ is also equipped with ball races $n$ adjacent each end of the internal rotor so as to enable ball bearings $o$ to be interposed between the two rotors. The internal rotor consists of a hub part $p$ which is keyed to the shaft $g$ and is connected to the body portion of the rotor by a web $q$ so that an annular chamber $r$ is formed at each side of the web. These two annular chambers together form the central chamber above referred to. $s$ are the channels or grooves formed in the inner surfaces of the side walls of the external rotor for enabling liquid in the central chamber to return to the space between the outer periphery of the internal rotor and the inner periphery of the external rotor. These channels may be radial as shown or curved to assist the liquid in taking up its tangential flow. $t$ are the conduits which are formed in the body portion of the internal rotor and extend inwardly so that their inner ends communicate with the central chamber. Each of these conduits is curved throughout its length so that one of the walls thereof may act like the active surface of a blade or vane.

In operation, the external rotor is driven from a motor or other suitable source of power with the result that the liquid located in the space between the two rotors is whirled around with the external rotor and when the speed of the latter, or the torque applied to the internal rotor by the moving liquid, is sufficient, the internal rotor will be caused to rotate. The liquid acting upon the internal rotor is led by the conduits or channels formed therein to the central chamber from which it passes outwardly under the influence of centrifugal force through the return conduits or channels to the annular space between the two rotors to again act upon the vanes or the walls of the conduits or channels formed in the internal rotor. This action will continue so long as motion is imparted to the external rotor and as the speed of the external rotor is increased so that the centrifugal force will be increased with the result that the liquid displacement in a radial direction and the speed ratio of the rotors will be progressively diminished. In other words, by the arrangement provided, the speed ratio is dependent upon, and will vary with, the speed of the external rotor and the liquid displacement will diminish as the speed ratio approaches unity. The efficiencies and speed ratios obtained will also depend upon the surface tension, viscosity and density of the liquid employed.

What we claim and desire to secure by Letters Patent of the United States is:—

1. Apparatus of the type described for the transmission of power comprising two rotary coaxial members arranged one within the other, the outer, driving member including two recessed parts secured together to form a cavity in which the inner, driven member rotates, the opposed walls of said cavity being both provided with a series of radially extending grooves, and the inner, driven member having a body provided with a central chamber, that communicates with said grooves in the outer member, and a series of conduits leading from said chamber through the periphery of the body of the inner member into the aforesaid cavity in the outer member, each of said conduits being curved in the direction of its length.

2. Apparatus of the type described for the transmission of power comprising two rotary coaxial members arranged one within the other, the inner, driven member, including a body provided with a central chamber and a series of fluid conduits extending from said chamber to the periphery of said member, each of said conduits being curved in the direction of its length, and the outer, driving member having a series of return conduits on each of its side walls for conducting fluid from said central chamber to the peripheral ends of the conduits in the inner or driven member.

THOMAS EDGAR BEAUMONT.
JOHN NOEL WARING.